B. A. DE WOERN.
METHOD OF AND MEANS FOR DISTILLING WATER.
APPLICATION FILED JUNE 10, 1920.
1,379,502. Patented May 24, 1921.
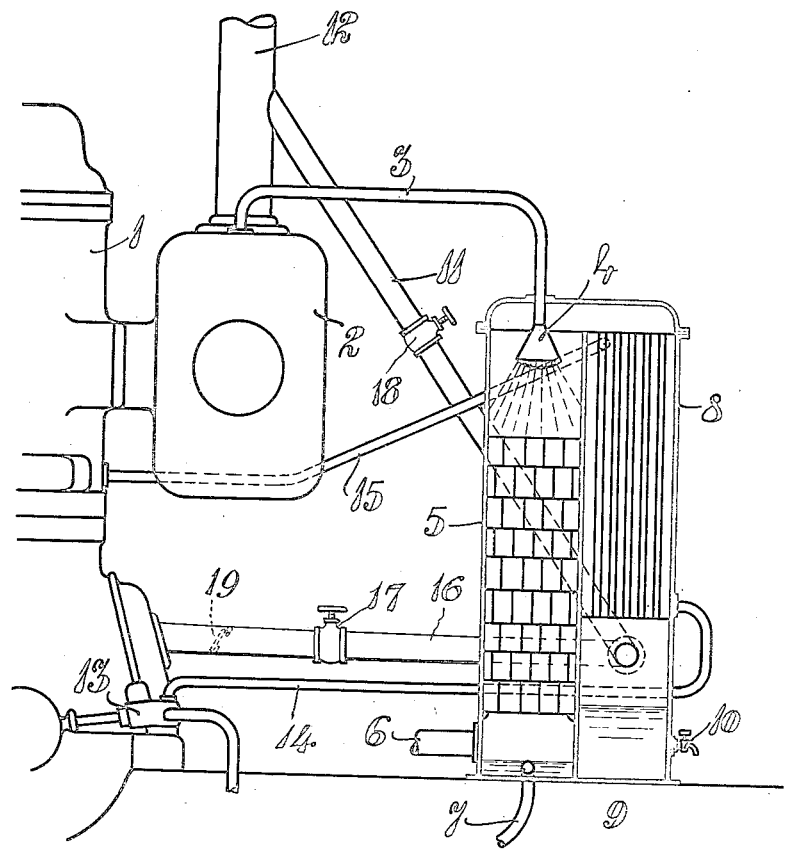

UNITED STATES PATENT OFFICE.

BROR ALGOR de WOERN, OF LYSEKIL, SWEDEN.

METHOD OF AND MEANS FOR DISTILLING WATER.

1,379,502. Specification of Letters Patent. Patented May 24, 1921.

Application filed June 10, 1920. Serial No. 388,030.

*To all whom it may concern:*

Be it known that I, BROR ALGOR DE WOERN, a citizen of the Kingdom of Sweden, residing at Lysekil, Sweden, have invented new and useful Improvements in Methods of and Means for Distilling Water, of which the following is a specification.

This invention relates to improvements in a method of and means for utilizing the heat carried off from a heat engine, such as an internal combustion engine, a steam engine or the like, by the cooling water for the purpose of distilling sea water.

According to this invention, the said cooling water is passed in one direction through a scrubber in a finely divided state, while air is passed through the scrubber in the opposite direction. Said air will thus be saturated with vapor from said heated water while passing through the scrubber. The air, after having been thus saturated, is passed from the scrubber and into a condenser, where the vapor contained in the air is again condensed and converted into fresh water.

The said condenser is, preferably, so connected with the cooling jackets of the engine that the cooling water is first caused to pass through the condenser to cool the damp air and thereupon introduced into the cooling jackets of the engine. The invention is particularly adapted for use on ship board, as it enables continuous conversion into fresh water of the salt water used for cooling the engine.

In the accompanying drawing a plant for carrying the above said method into effect is illustrated diagrammatically, the distilling apparatus proper being shown in vertical section, while the connection between said apparatus and the engine is shown in elevation.

With reference to the drawing, the numeral 1 indicates part of an internal combustion engine which is assumed to be provided with a cooling jacket, and 2 is the silencer which is also assumed to be provided with a cooling jacket. The said last mentioned cooling jacket is connected by a pipe 3 to a sprinkler 4 contained in the upper portion of a scrubber 5. The scrubber 5 may for instance consist of a cylinder having in it a plurality of small apertures or channels permitting a slow flow of the water from the sprinkler 4 and down to the bottom of the cylinder. Near its bottom the cylinder 5 is provided with an air-inlet 6 and with a water discharge pipe 7.

In close proximity to the cylinder 5 there is is provided a condenser 8 the tube system of which is connected at its upper end with the top of the cylinder 5 while opening at its lower end into a water storage chamber 9. Said chamber 9 is provided with a water discharge cock 10. Leading from the upper portion of the chamber 9 to the exhaust pipe 12 of the engine is a pipe 11 having a valve 18 which may also open directly to the atmosphere, if desired.

The supply of cooling water to the condenser 8 is effected by a pump 13 connected by the pipe 14 to the lower portion of the cooling chamber of the condenser 8. Leading from an upper point of said chamber to the cooling jacket of the engine 1 is a pipe 15 in order that a single pump may be sufficient for feeding both the condenser and the motor with cooling water.

The operation is as follows:

The cooling water, after having passed through the jacket of the engine 1 and that of the silencer 2 flows in a heated state through the pipe 3 and into the sprinkler 4 from which it is distributed over the aperture or channel system of the scrubber 5 and flows slowly and in a finely divided state through said system. At the same time, air under pressure is admitted into the cylinder or trickle chamber 5 through the pipe 6 and said air will ascend through the apertures or channels of the scrubber 5 while absorbing vapor from the heated water running downwardly. From the scrubber the air saturated with water vapor is led over into the condenser 8 at the top thereof and is then caused to again give off its contents of water vapor while passing down through said condenser. The water not carried off from the scrubber by the air passing therethrough collects on the bottom of the cylinder 5 and is discharged through the pipe 7. The water drawn off from the air in the condenser 8 collects in the chamber 10 as fresh water and may be tapped through the cock 10, whenever desired. The air after having been freed from its contents of water vapor in the condenser, escapes through the connecting pipe 11 and the exhaust pipe 12.

The cold water forced by the pump 13 through the pipe 14 and into the cooling chamber of the condenser leaves the condenser through the pipe 15 and passes to the cooling jacket of the engine from which it will pass in a heated state to the jacket of the silencer and from the latter to the sprinkler 4, and so on, in the way described.

It should be understood that modifications of the method and means above described may be made without departing from the principle or scope of the invention. When using the invention in connection with an internal combustion engine, the crank case of which is used as a pump chamber, the air escaping from the condenser chamber 9 may be admitted to the said crank case through pipe 16 provided with a cut off valve 17 and a non-return valve 19, so that the engine is caused to draw the necessary air through the apparatus.

While the invention is herein disclosed as combined with an internal combustion engine, it is to be understood that the invention is also adapted for use in connection with heat engines generally having water cooling systems.

I claim:—

1. In a method of distilling water, passing the heated water discharged from the cooling jackets of an internal combustion engine, the crank case of which is used as a pump chamber, through a scrubber in one direction, forcing air through said scrubber in the opposite direction, then cooling the air and condensing the vapor mingled therewith, and introducing the cooled air into the said crank case, substantially as and for the purpose set forth.

2. In a self-contained condensing plant for marine engines, a condenser comprising a trickle chamber connected at one end to a tubular condenser, means to supply water from the jackets of the engine to the upper end of the trickle chamber, a collecting chamber at the end of said condenser, means to admit air to the bottom of the trickle chamber and means to discharge air from the collecting chamber into the exhaust pipe of the engine to assist the flow of air through the series connected trickle chamber and condenser.

3. In a self-contained condensing plant for marine engines, a condenser comprising a trickle chamber connected at one end to a tubular condenser, means to supply water from the jackets of the engine to the upper end of the trickle chamber, a collecting chamber at the end of said condenser, means to admit air to the bottom of the trickle chamber, means to discharge air from the collecting chamber into the exhaust pipe of the engine to assist the flow of air through the series connected trickle chamber and condenser, and auxiliary means to supply air from said collecting chamber to the engine crank case when desired.

In testimony whereof I have signed my name.

BROR ALGOR DE WOERN.